United States Patent [19]

Thompson

[11] Patent Number: 5,297,730
[45] Date of Patent: Mar. 29, 1994

[54] APPARATUS AND METHOD FOR CONTROLLING WEEDS AND UNDERGROWTH

[75] Inventor: James E. Thompson, Winter Haven, Fla.

[73] Assignee: Aquaheat Technology, Inc., Minneapolis, Minn.

[21] Appl. No.: 935,865

[22] Filed: Aug. 26, 1992

Related U.S. Application Data

[63] Continuation-in-part of Ser. No. 906,032, Jun. 26, 1992, abandoned, which is a continuation of Ser. No. 583,576, Sep. 14, 1990, abandoned.

[51] Int. Cl.$^5$ ............................ B05B 1/24; B05B 1/20
[52] U.S. Cl. ........................................ 239/13; 239/130; 239/163; 239/166; 239/172
[58] Field of Search ............... 239/159, 163, 164, 167, 239/166, 172, 13, 130, 131, 135

[56] References Cited

U.S. PATENT DOCUMENTS

| | | | |
|---|---|---|---|
| 1,195,027 | 8/1916 | Jones | 239/163 |
| 2,605,137 | 7/1952 | Ofeldt | 239/13 |
| 2,908,994 | 10/1959 | Jedrzykowski | 239/131 |
| 3,242,098 | 3/1966 | Andrews | 239/138 |
| 3,666,178 | 5/1972 | Crimmins et al. | 239/172 |
| 4,186,879 | 2/1980 | Kinder | 239/159 |
| 4,353,505 | 10/1982 | Kinder | 239/167 |
| 5,156,338 | 10/1992 | Borland et al. | 239/159 |
| 5,184,775 | 2/1993 | Kerber | 239/601 |

*Primary Examiner*—Andres Kashnikow
*Assistant Examiner*—Christopher G. Trainor
*Attorney, Agent, or Firm*—Pettis & McDonald

[57] ABSTRACT

An apparatus and method for controlling weeds and undergrowth, as well as insect infestation, as are typically encountered in agricultural environments is disclosed. The apparatus is characterized by its construction to include a heater whereby liquid spray material is first heated to a temperature of from about 100° F. to about 240° F. and then sprayed on the substance to be controlled. The apparatus is further characterized by its construction to include an insulating apron for maintaining the heated spray material in close contact with the substance onto which it is sprayed, while at the same time insulating the heated spray and treated substance from ambient conditions. A variety of fluid conduits and controls are provided so that a variety of spray liquids may be applied in predetermined fashion. The apparatus is constructed so that it can be attached to a standard tractor for ease of use. The method of this invention is characterized by its utilization of agricultural chemicals in amounts from virtually 0% to about 50% of their current recommended dose rate.

16 Claims, 6 Drawing Sheets

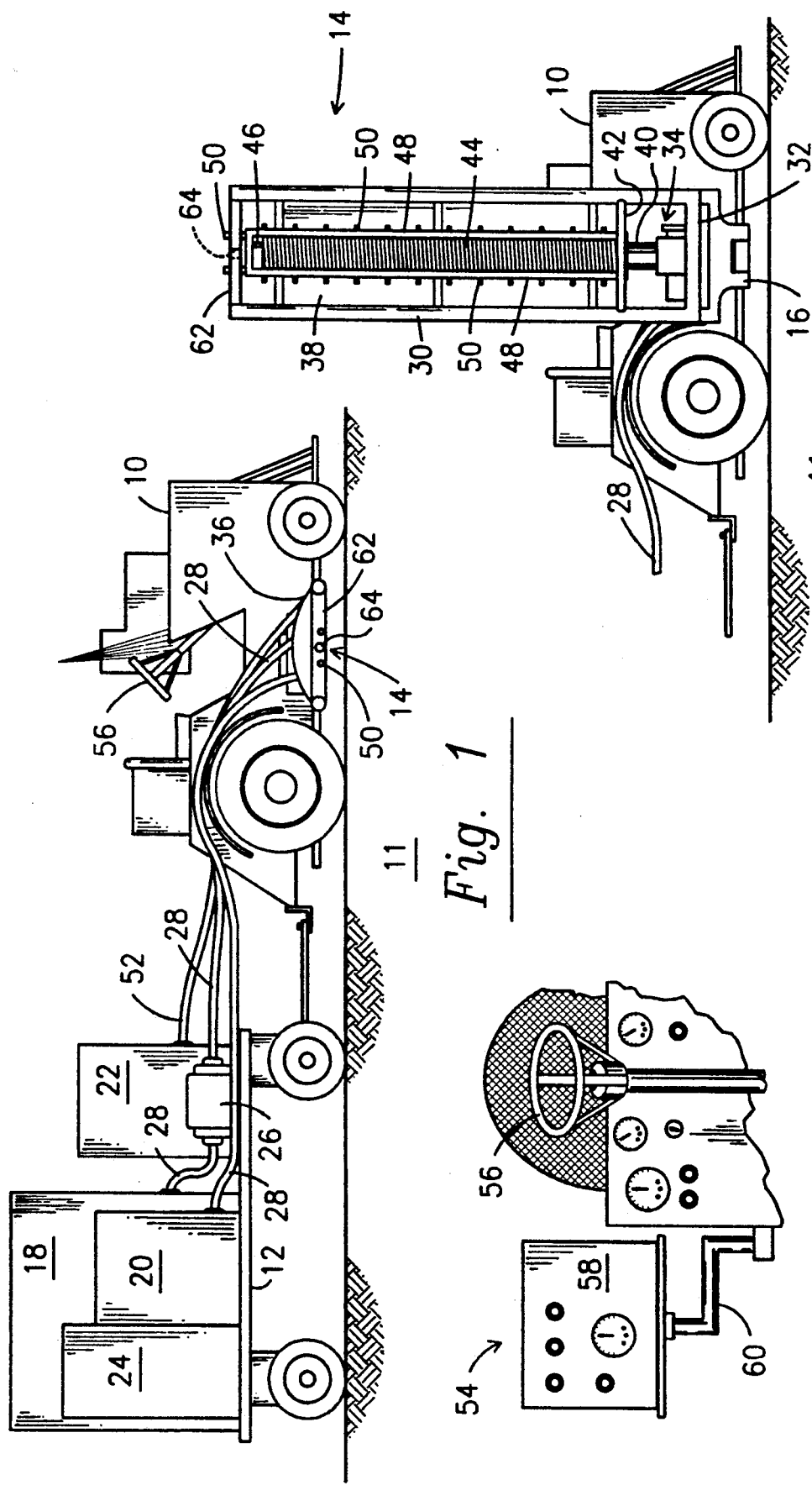

APPARATUS AND METHOD FOR CONTROLLING WEEDS AND UNDERGROWTH

RELATED APPLICATIONS

This is a continuation-in-part application of my presently co-pending application Ser. No. 07/906,032, filed Jun. 26, 1992, now abandoned which was a continuation of my prior application Ser. No. 07/583,576, filed Sep. 14, 1990, now abandoned.

BACKGROUND OF THE INVENTION

1. Field of the Invention

The present invention relates to both an apparatus and a method for controlling weeds and undergrowth in agricultural settings. In a first preferred embodiment, the invention utilizes a spray of heated water for controlling the undesirable substances, and is particularly characterized by its construction to include an apron, or blanket, which serves to insulate the heated spray from ambient conditions, thereby increasing the efficacy of the spray in controlling undesirable weeds and undergrowth. According to a second embodiment, the invention utilizes spray solutions including active ingredients in the range of about 10% to about 50% of the normal, recommended dose rate. As is set forth in greater detail below, it has been discovered that effective control of the undesirable substances can be obtained utilizing from zero to one-half the normally required chemical treatment materials by first heating the liquid spray material to a temperature of from about 100° F. to about 240° F. before spraying.

2. Description of the Prior Art

Within the agricultural industry, various methods are known and recognized as being effective for controlling the growth of weeds and other undesirable substances. Many such methods involve the application of aqueous solutions of treatment chemicals onto the undesirable substances. Over the past years, as we have become more aware of our environment and the delicate balances that must be maintained in order to preserve a healthy environment, much care and concern have arisen over the utilization of toxic chemicals for weed and undergrowth control as well as for insect control. One merely has to read the labels of numerous commercially-available insecticides and herbicides to appreciate the caution which must be exercised in their proper use.

Utilization of herbicides and insecticides not only subjects the user to personal danger, but also may damage desirable crops if the treatment materials are not applied properly. Furthermore, accumulations of treatment materials in the soil and in water sources are now recognized as further dangers to the environmental balance.

In recognition of the dangers attendant to the use of herbicides and pesticides, manufacturers of such products maintain elaborate and expensive testing facilities. Both local and national governments also expend large sums of money and resources for the purpose of determining and monitoring safe and effective dose rates for such chemicals. In fact, most efforts for making the use of herbicides and insecticides safer to our environment involve efforts to formulate "safer" chemicals.

Nevertheless, prior patent literature does disclose at least one apparatus for eliminating undesirable vegetation growth which is relatively safe to the environment. U.S. Pat. No. 213,255 to Simpson discloses an apparatus which uses steam and/or hot water to kill vegetation on railroad beds. According to the disclosure of that patent, the application of steam and/or hot water provided by the steam locomotive engine is efficacious for killing vegetation which might seek to grow along the tracks and railway bed.

Other prior art devices such as, for example, U.S. Pat. No. 3,242,098, to Andrews, are also known in the prior art. However, the Andrews patent discloses an apparatus for generating a vapor or fog for purposes of concealment, for controlling atmospheric temperature, for disseminating insecticide or other materials into the outside atmosphere or into confined spaces, etc. A vehicle-mounted spray apparatus is disclosed in U.S. Pat. No. 4,817,870, to Dalton. However, the device of the Dalton patent is primarily concerned with spraying materials onto a road or highway. U.S. Pat. No. 3,986,670, to Syveson discloses a hand held thermal electric fogging device for dispensing a fog, or cloud, of insecticide. Other similar devices are also known in the art, and virtually all such devices that involve heating the material before spraying apply sufficient heat and pressure so that the material is dispensed as a fog. It is clear that the use of such vapors or fogs would be quite inefficient in that they would clearly be subject to drift onto plants which should not be treated and to significant dispersion into the atmosphere because of the gas-like nature of the fog. Furthermore, if active ingredient chemicals are included in such fogged sprays, hazardous conditions for both the operator and the surrounding environment may be created because of the wide dispersion of the fogged material.

It is, therefore, clear that there is a great need in the art for an new apparatus and method for controlling undesirable vegetation growth and insect infestation in a manner which would not result in the addition of new and increased levels of chemical poisons to our environment.

SUMMARY OF THE INVENTION

The present invention is for an apparatus and method for controlling weeds and undergrowth as well as insects in agricultural environments by the application of a heated liquid spray. Most simply stated, the apparatus of this invention comprises a supply of liquid to be sprayed, at least one spray tip for directing the liquid onto the substance to be controlled, means for delivering the liquid to the spray tip, and means for heating the liquid before it is sprayed. As is set forth in greater detail below, it has been determined that the use of chemically active herbicides and insecticides may be virtually eliminated if the apparatus also includes means for insulating the heated spray liquid from ambient conditions while maintaining the heated liquid spray in close proximity to the substance to be controlled. According to a first preferred embodiment of this invention, such retention and insulation is provided by means of an apron, or blanket, which is attached to the apparatus so as to insulate the sprayed liquid from ambient conditions for a predetermined period of time of from a few seconds to a minute or more. According to this first preferred embodiment, the heated spray material comprises water, and second spray means are included whereby minor quantities of chemically active ingredients may be sprayed following treatment with the heated water.

According to a second preferred embodiment, the apparatus of this invention includes means for mixing chemically active treatment materials with water, and the resulting mixture is then heated and sprayed. It has been determined that by heating the spray liquid before it is applied, one may utilize an effective ingredient of only about 10% to about 50% of the normally-recommended dose rate. When utilizing a mixture including chemically active ingredients, a heated spray liquid temperature of about 100° F. to about 210° F. is preferred.

While it has been determined that the apparatus and method of this invention is suitable for the application of herbicides and insecticides, as well as simply heated water, it is believed that the apparatus and method may also be utilized in combination with simultaneous application of fertilizer to nourish the desired agricultural product from which the weeds, undergrowth or insects are being removed.

In both embodiments, apparatus of this invention is constructed for use in combination with a tractor. Treatment liquids, as well as pump means for mixing spray liquids as desired and for delivering the spray liquids to a plurality of spray tips are preferably provided on a trailer which is towed by the tractor. Movably mounted onto the tractor is at least one spray boom which includes a plurality of spray heads. The heater means for heating the spray liquid may be mounted on the trailer, or incorporated into the spray boom. In the first preferred embodiment, the invention further comprises a second spray boom that is also movably mounted on the tractor rearwardly of, and substantially parallel to, the first spray boom. In this preferred embodiment, an insulated apron, or blanket, extends between the two spray booms, and in either embodiment, the booms and the apron are movable between a lowered, first operative position and a raised, second transport position. Movement may be accomplished by any suitable means such as, for example, an hydraulic system operatively attached to the tractor. In similar fashion, the tractor may provide the motive power for operating the delivery means of this invention.

For both embodiments of the invention, the heater means is of a construction substantially similar to that disclosed in U.S. Pat. No. 4,742,643, the disclosure of which is incorporated herein.

The invention further comprises a control means whereby the temperature of the spray liquid can be regulated, the flow rate of the spray liquid can be regulated, and dispensing of spray liquid from individual groups of a plurality of spray tips may be regulated. The control means may also regulate the ratio of chemically active ingredient to water if the spraying of such mixtures is desired.

The apparatus may further comprise return means for directing heated fluid to a return tank in those instances when the control means is utilized to cease the passage of heated spray liquid through the spray tips, as when the tractor carrying the apparatus is turning around or otherwise maneuvering in an area where spraying is not desired.

While this invention has been generally described as of the size and type for use in combination with a tractor, it is to be understood that the scope of the invention is not limited to such an embodiment. It is contemplated that a smaller version of the apparatus may be constructed for use by a single person. For example, such a smaller apparatus, still utilizing the method of this invention, would be suitable for personal use in edging driveways, patios or walks, and even for maintaining flower beds and small gardens. It is also to be noted that while the spray booms and apron of this invention are shown in the drawings as extending from one side of the tractor, the invention does contemplate placement of those mechanisms on any and all sides of the tractor. That is to say, a spray boom/apron structure might be provided in front of the tractor, or behind the tractor, or on either of its two sides or, conceivably, in all four locations as well as under the body of the tractor.

It is also to be remembered that the apparatus and method of this invention are suitable for use not only with plain water, but also with herbicides and insecticides. Miticides have been applied with efficacy under test conditions, and significant kill of fire ants has also been noted, both with the application of very minor amounts of fire ant killers and with the application of nothing other than heated water sprays. As mentioned above, desirable nutrients in the form of liquid or water soluble fertilizers may also be applied utilizing the apparatus of this invention.

Of particular note with regard to the apparatus and method of this invention is its utilization of significantly reduced quantities of active ingredient treatment chemicals. Because of the efficiency of the insulated, heated water spray, many applications will find that the use of treatment chemicals simply is not required. In those instances where treatment chemicals are desirable or deemed necessary, much reduced quantities of those chemicals are effective. This is not only safer for the operator and other personnel involved, but also is much safer for the continued growth of desirable vegetation and for the safety of our environment. Clearly, since greatly reduced quantities of active ingredient chemicals would be utilized, the apparatus and method of this invention also provide greater economy for the user.

The invention accordingly comprises the several steps and the relation of one or more of such steps with respect to each of the others, and the apparatus embodying features of construction, combinations of elements, and arrangements of parts which are adapted to effect such steps, all is exemplified in the following detailed description, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a side elevational view of the apparatus in one embodiment as installed on a tractor.

FIG. 2 is a partial elevational view similar to that of FIG. 1 with the spray boom in its second, transport position.

FIG. 5 is a fragmentary elevational view showing the placement of the panel of the control means adjacent the cab of the tractor.

Similar reference characters refer to similar parts throughout the several views of the drawings.

DETAILED DESCRIPTION

Figure 3:
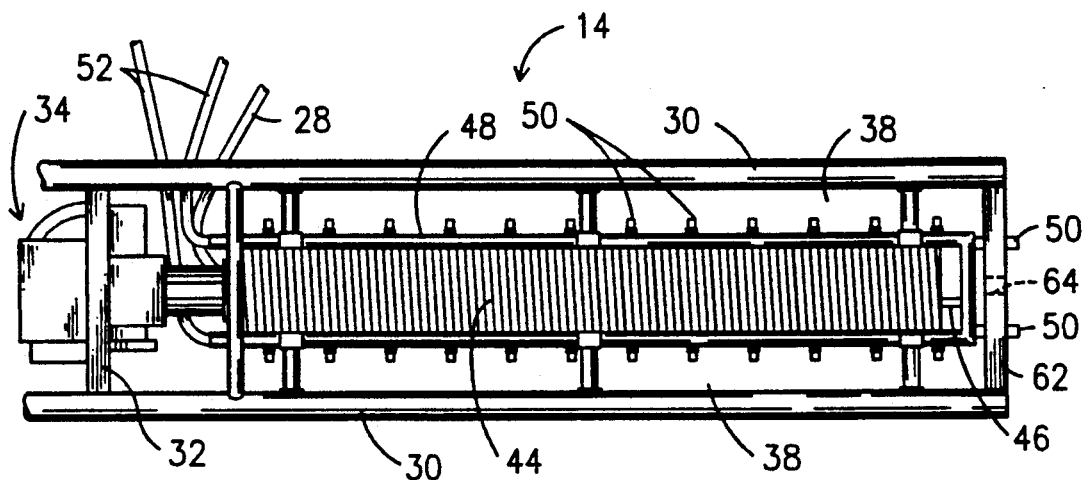
FIG. 3 is a fragmentary bottom plan view of the spray boom.

Referring first to the view of FIG. 1, an embodiment of the apparatus for controlling weeds and undergrowth is illustrated. In this embodiment, the apparatus is shown as being operatively installed on a tractor 10 so that the apparatus can be moved across a supporting surface 11 for the application of liquid spray. A trailer 12 is towed by tractor 10, and a spray boom, generally indicated as 14, is movably attached to the tractor 10. As seen in the view of FIG. 1, spray boom 14 is shown in a first, operative position, and extends substantially normal to the direction of travel of tractor 10 and substantially parallel to and spaced apart above supporting surface 11. Referring to the view of FIG. 2, spray boom 14 is shown in its second, transport position. The spray boom 14 is attached to tractor 10 by hinge means 16 so that it can be raised and lowered as shown in FIGS. 1 and 2 as by an hydraulic system (not shown) which may also be attached to and powered by tractor 10. It is, of course, to be understood that the scope of this invention is not limited to the utilization of a vehicle such as tractor 10, and any suitable means for maneuvering and operating the apparatus of this invention may be employed.

Referring again to the view of FIG. 1, it can be seen that this embodiment includes a plurality of receptacles, or tanks, mounted on trailer 12. Without limiting the scope of the invention, tank 18 is a water reservoir, tank 20 is a chemical reservoir, tank 22 is a return tank for unused liquid spray (as more fully described hereinafter), and tank 24 contains diesel fuel. Means for delivering the liquid from the various supply tanks to spray boom 14 are provided in the form of a mixing pump 26 which is also mounted on trailer 12. Mixing pump 26 is preferably powered by tractor 10 and is of standard construction suitable not only for pumping liquid materials, but also for mixing a plurality of liquids in predetermined, variable ratios to yield a delivered liquid of known constituent composition. Thus, according to known procedures and technologies, pump 26 may be utilized to mix water from tank 18 with chemical from tank 20 in predetermined ratios to prepare and deliver spray liquid to spray boom 14. Delivery of material to and from pump 26 is accomplished through suitable conduits 28.

Figure 4:
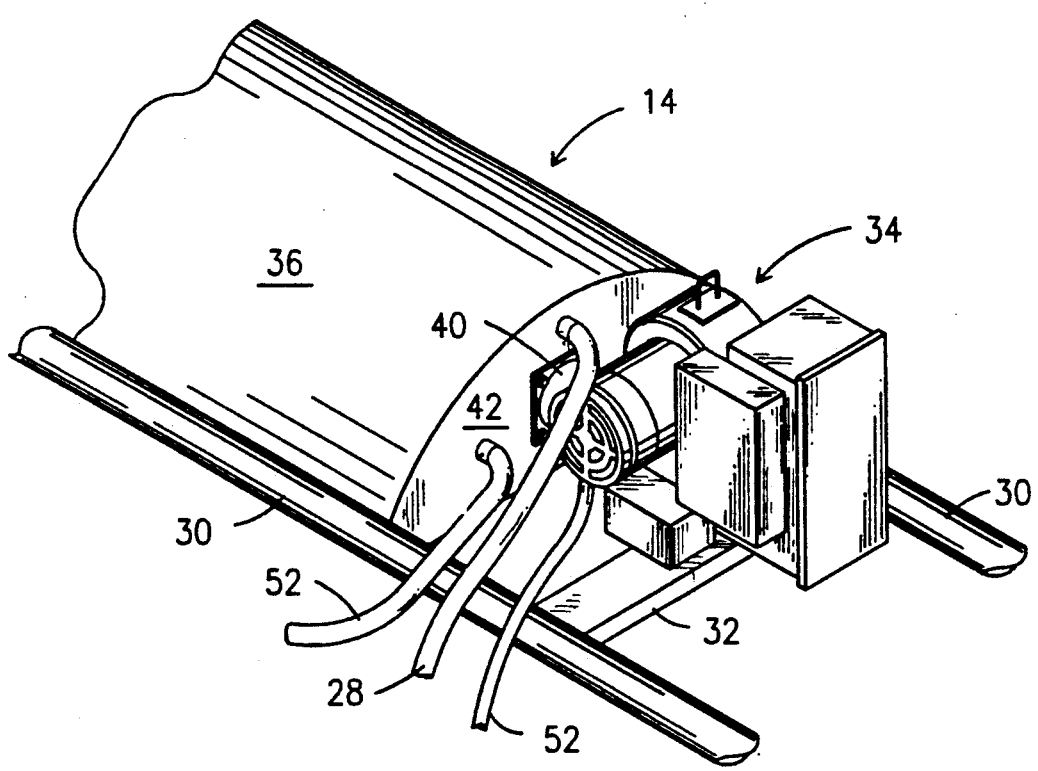
FIG. 4 is a fragmentary perspective view of the spray boom and the heater means mounted thereon.

Attention is now invited to the view of FIG. 4, wherein a perspective detailed view of a segment of spray boom 14 is illustrated. As shown in FIG. 4, spray boom 14 includes a frame 30, and it is frame 30 which attaches to hinge means 16 so that spray boom 14 may be moved between its first and second positions as shown in the views of FIGS. 1 and 2. Mounted on frame 30, and more particularly on cross member 32 thereof is a diesel-fueled heater means, generally indicated as 34. As indicated above, heater means 34 is substantially identical in construction and operation to the similar device disclosed in my U.S. Pat. No. 4,742,643.

Also attached to frame 30 is a cover 36 of substantially semicircular cross-section, with the open side of cover 36 facing supporting surface 11 when spray boom 14 is in its first, operative position. The interior surface 38 of cover 36 is insulated as with, for example, a ceramic insulating material. Heater means 34 communicates with the interior of cover 36 by means of throat 40 which is operatively attached to end wall 42 of cover 36. An aperture (not shown) is provided through end wall 42 so that the flame from heater means 34 may project axially along the interior of cover 36.

Referring now to the view of FIG. 3, it can be seen that a helical coil 44, formed from tubing having an inside diameter of about one inch, is also mounted within cover 36 of spray boom 14. As best seen in the views of FIGS. 3 and 4, helical coil 44 is in fluid receiving relation to conduit 28 which delivers spray liquid from pump 26. Thus, the spray liquid travels the helical path defined by coil 44 and liquid contained therein is subjected to heating by the flame of heater means 34. The distal end 46 of coil 44 is in fluid communicating relation with heated spray fluid conduit 48, whereby heated spray fluid is ultimately delivered to a plurality of spray tips 50 for spraying on weeds, undergrowth and other undesirable substances.

As most clearly seen in the view of FIG. 3, the ends of heated spray fluid conduit 48 which pass through end wall 42 of cover 36 are provided with return conduits 52, whereby unused heated spray fluid may be returned to tank 22 for subsequent reuse.

Finally, referring to the view of FIG. 5, there is illustrated a control means, generally indicated as 54 which is mounted substantially adjacent the steering wheel 56 of tractor 10 for convenience of the operator. Control means 54 includes a control panel box 58 and a movable mounting bracket 60. Bracket 60 permits the operator to position panel box 58 for convenient observation and operation. Panel box 58 includes a plurality of switches and gauges which are operatively connected to mixing pump 26, heater means 34, and valves (not shown) which regulate the passage of heated spray fluid through each of the spray tips 50. Therefore, by utilizing the controls provided on panel box 58, the operator may regulate the ratio of water to chemical in the liquid spray material, may regulate the flow rate of spray material from pump 26, and may regulate the operation of heater means 34 to provide a heated spray of predetermined temperature. It should also be noted that distal end wall 62 of cover 36 is provided with a sight glass 64 whereby the flame provided by heater means 34 may be visually observed.

In the embodiment illustrated in drawing FIGS. 1-5, helical coil 44 defines approximately 200 linear feet of tubing having an inside diameter of about one inch. The spray boom 14 is therefore on the order of about 6-8 feet in length extending from the side of tractor 10. It is, of course, to be remembered and noted that this detailed description is but for one embodiment of the apparatus of this invention, and another preferred embodiment is described hereinafter. The apparatus is not limited to the specific size and dimension set forth herein, and need not be attached to a tractor 10 as shown in the drawings. The means for heating the spray fluid is also not to be limited to the diesel-fueled heater means 34 as described with regard to this embodiment. Any suitable means for heating the spray liquid may be utilized. It is, however, necessary that the final temperature of the spray liquid be in the range of about 100° F. to about 240° F. As is set forth in greater detail hereinafter, it has been determined that the final temperature of the spray liquid is, at least to a significant degree, a function of the concentration of chemical in the spray material. Generally, at lower chemical concentrations, higher temperatures are utilized. Conversely, at relatively higher chemical concentrations, reduced temperatures still exhibit efficacy. When no chemicals are added to the water, spray temperature may approach about 240° F.

Having thus set forth one construction for the apparatus of this invention, attention is now invited to a description of its use and the attendant unique method for controlling weeds and undergrowth as provided by this embodiment. According to the method of this invention, a treatment chemical is selected, and the chemical is mixed with water for spraying. Chemicals utilized in the method of this invention may be selected from the group consisting of herbicides, oils, surfactants, insecticides, and fertilizers. It is well known in the state-of-the-art to utilize surfactants in combination with various herbicides, oils and insecticides for the purpose of preparing the surfaces being sprayed to receive the active ingredients. As a result of this invention, the utilization of surfactants (commonly referred to as "stickers" within the industry) may be significantly reduced and actually eliminated. It is believed that the action of the heated spray sufficiently prepares the surface of undesired weeds and undergrowth to accept the herbicide, oil or insecticide being sprayed as the active ingredient. Of course, as already indicated above, the method of this invention is characterized not only by the step of heating the liquid spray material before its application, but also by the formulation of the spray material itself with significantly reduced quantities of active ingredient.

At spray temperatures approaching about 210° F., it has been determined that as little as about 10% of the normally recommended dose of herbicide, oil or insecticide may be utilized. As the spray temperature diminishes toward about 100° F., the amount of active ingredient is increased up to about 50% of the manufacturer's recommendation.

It is to be understood, then, that significant enhancement of both safety factors and economic considerations are provided according to the method of this invention, utilizing the claimed apparatus, without sacrificing efficacy in controlling undesired substances such as weeds, undergrowth and insects.

Suitable chemicals for use in the method of this invention are commonly referred to as herbicides and insecticides. Within the family of herbicides, useful substances include pre-emergence soil residual herbicides, post-emergence systemic herbicides, and post-emergence contact herbicides. Such products are well known within the agricultural industry and listings of acceptable commercial products and recommend dose rates are provided in a variety of commercial and technical publications such as, for example, the Florida Citrus Spray Guide which is published by the Florida Cooperative Extension Service of the Institute of Food and Agricultural Sciences at the University of Florida, Gainesville, Fla. That same publication, and other such publications as well as technical literature published by manufacturers also identifies oils suitable for use in the method of this application and miticides and fire ant killers which may be effectively applied in aqueous solution according to the method of this invention. It is to be noted that when the apparatus and method of this invention are utilized for spraying oil, the temperature of the spray liquid is maintained at the lower end of the scale, or at about 100° F.

It has also been noted that the addition of about 1%-2%, by volume, of the polymer Carbopol made and sold by B. F. Goodrich Company, appears to enhance the efficacy of herbicides sprayed in accord with the method of this invention. It is believed that the polymer retards heat dissipation as the material is sprayed onto the undesired products.

In one test application utilizing the apparatus and method of this invention, the pre-emergence soil residual herbicide made and sold by Du Pont under the name Krovar was applied at 50% of its recommended dose rate with a spray temperature of about 150° F. No surfactant was utilized. Substantially 100% kill of weeds was noted.

Having thus described the method of this invention, its safety and economy will be apparent to a person skilled in the art. Other advantages deriving from the utilization of the apparatus and method of this invention should also be noted. Because the water and treatment chemicals are maintained in separate tanks and mixed immediately before spraying, waste material is virtually eliminated, resulting not only in enhanced economy, but also virtually eliminating problems attendant with the disposal of mixed but unused herbicides and insecticides. Because a mixing pump is utilized as the means for delivering the spray liquid through the heater to the spray tips, the exposure of toxic chemicals to operators is significantly reduced. Finally, because of the construction of the spray boom including a substantially hemispherical cover, accurate placement of the liquid spray is insured, with significantly reduced risks from drifting.

Finally, it must be noted that during the course of the development of this invention, it was clearly noted that the application of heated water only at a temperature of about 210° F. resulted in significant killing of undesired weeds and undergrowth. It is believed that the apparatus of this invention can, therefore, be effectively utilized for agricultural maintenance without the addition of any toxic chemicals.

Attention is now invited to the views of FIGS. 6–11 wherein the preferred first embodiment for this invention is shown. The embodiment of FIGS. 6–11 is said to be preferred for the reason that this embodiment provides an apparatus and method for controlling weeds and undergrowth wherein no chemically active ingredients are required. As is set forth in greater detail below, however, provisions are made for the use of chemically active ingredients in those situations where minor amounts of herbicides, insecticides, etc., would be efficacious. Of course, as noted above, a unique feature of this invention is its ability to control weeds and undergrowth with extremely minor amounts of chemically active agents.

Referring specifically to the view of FIG. 6, in this preferred embodiment, the apparatus is shown as being operatively installed on a tractor 66 so that the apparatus can be moved across a supporting surface 68 for the application of liquid spray. A trailer 70 is towed by tractor 66, and the spray means, generally indicated as 72, is movably attached to the tractor 66 by forward mounting bracket 74 and rear mounting bracket 76. As seen in the view of FIG. 6, spray means 72 is shown in a first, operative position, and extends substantially normal to the direction of travel of tractor 66 and substantially parallel to and spaced apart from supporting surface 68. As perhaps best seen in the views of FIGS. 10 and 11, spray means 72 is attached to tractor 66 by forward and rear mounting brackets 74 and 76 so that it can be raised and lowered as indicated by the directional arrows in FIGS. 10 and 11 as by an hydraulic system (not shown) which may also be attached to and powered by tractor 66.

Figure 6:
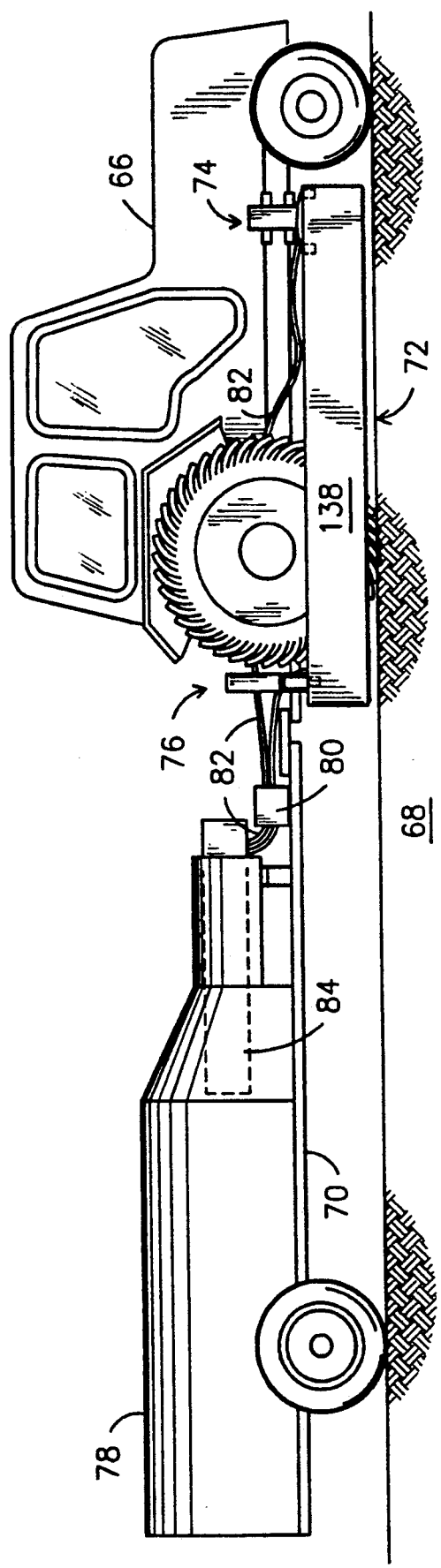
FIG. 6 is a side elevational view of the apparatus in a preferred, first embodiment as installed on a tractor.

Referring again to the view of FIG. 6, it can be seen that this preferred embodiment includes a rather large tank 78 mounted on trailer 70. Contained within tank 78 is at least one water tank, and the tank 78 may also include, for example, chemical tanks, mixing tanks, and even return tanks. Means for delivering the liquid from tank 78 to spray means 72 is provided in the form of a pump 80 which is also mounted on trailer 70. Pump 80 is preferably powered by tractor 66 and delivery of material to and from pump 80 is accomplished through suitable conduits 82. Also shown schematically in the view of FIG. 6 is heater means 84, through which material to be heated before it is sprayed is passed.

Figure 7:
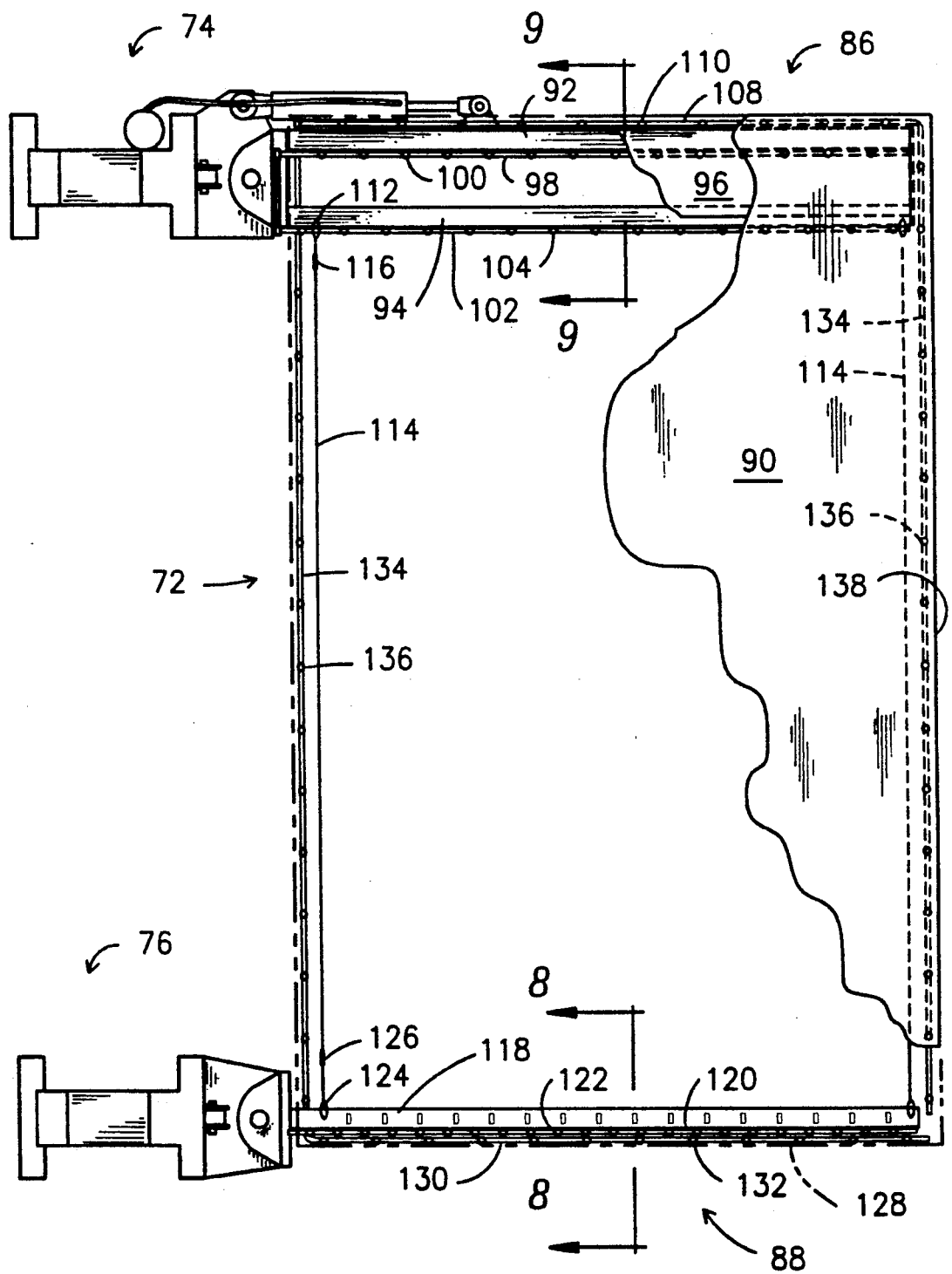
FIG. 7 is a top, plan view of the first and second spray booms and the apron of the preferred embodiment, with portions broken away to illustrate interior detail.
Figure 8:
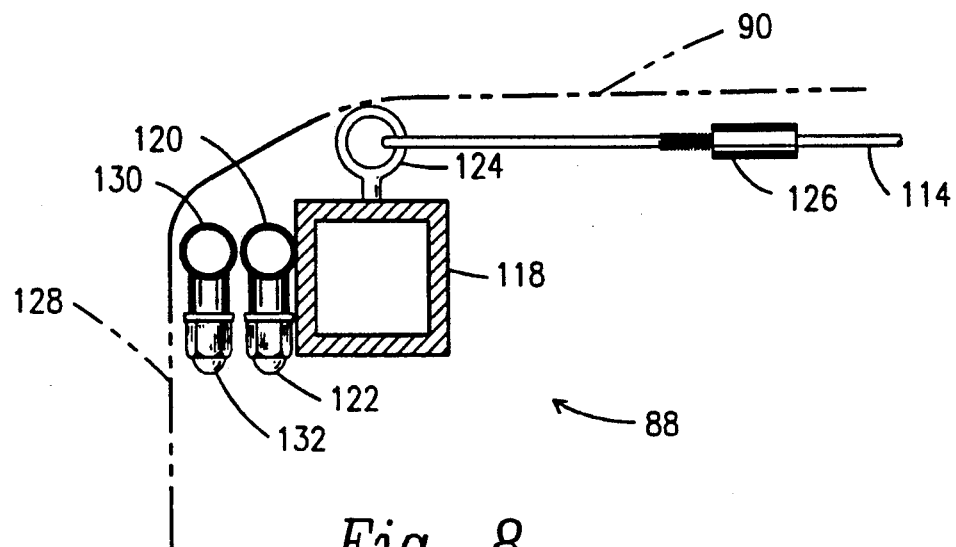
FIG. 8 is a sectional view taken along line 8—8 of FIG. 7.
Figure 9:
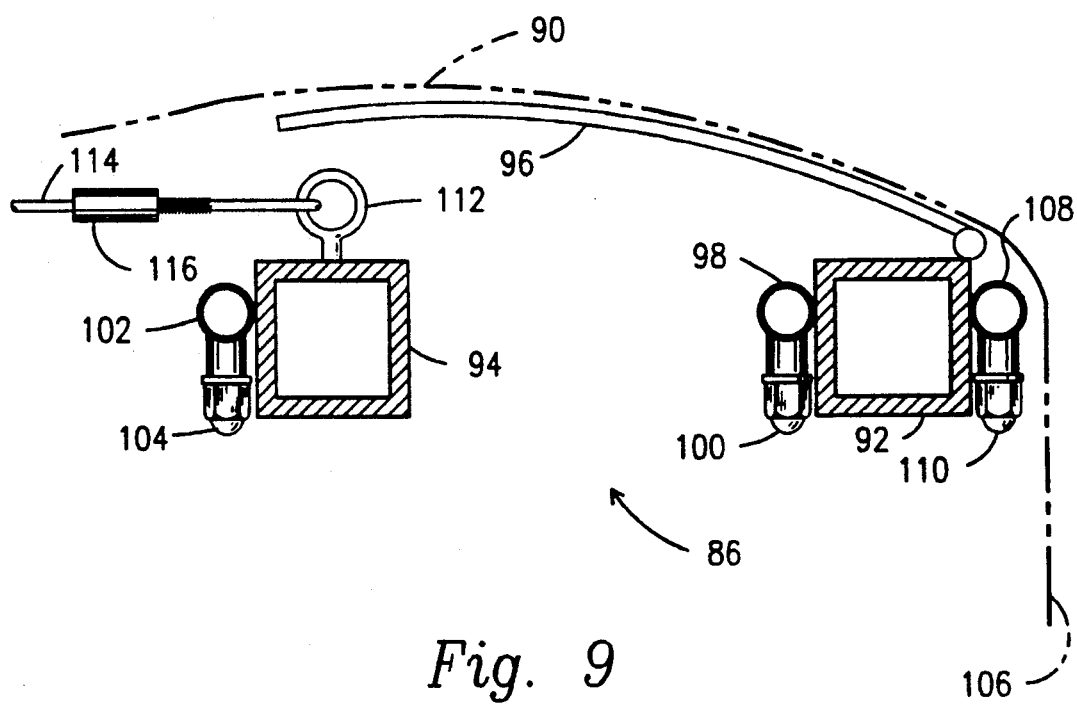
FIG. 9 is a sectional view taken along line 9—9 of FIG. 7.

Referring now to the views of FIGS. 7, 8 and 9, construction details for the spray means 72 may be observed. Spray means 72 comprises a first boom, generally indicated as 86 operatively attached to forward mounting bracket 74, and a second boom, generally indicated as 88, operatively attached to rear mounting bracket 76. Extending between the first boom 86 and the second boom 88 is apron 90.

Referring now to the view of FIG. 9, one may see that first boom 86 is defined by a pair of box beams 92 and 94, and a deflector shield 96 attached to beam 92 and curving rearwardly to a position substantially over beam 94. Mounted on the interior side of beam 92 is a fluid conduit 98, and a plurality of first spray tips 100 are operatively connected thereto. Rear fluid conduit 102 is similarly mounted on beam 94, and a plurality of auxiliary spray tips 104 are operatively mounted on conduit 102. It is, of course, to be understood that conduits 98 and 102 are connected to the source of fluid contained within the tank 78 by conduits 82. Also, in this preferred embodiment, the placement of first spray tips 100 and auxiliary spray tips 104 along their respective lengths of conduits 98 and 102 is such that they are staggered to provide a more complete application of heated fluid spray therefrom.

Also visible in the view of FIG. 9 is a segment of the apron 90. As shown in FIG. 9, a forward portion 106 of apron 90 extends beyond deflector shield 96, downwardly in front of beam 92. Also shown in the view of FIG. 9 are forward curtain conduit 108 mounted to the front of beam 92 and a plurality of forward curtain spray tips 110 operatively attached to curtain conduit 108. Of course, these elements are also shown in the view of FIG. 7. One can also see that an eye 112 is attached to the top of beam 94 and that a cable 114 extends therefrom, the cable being held in tension by a forward biasing means 116.

Referring now to the view of FIG. 8, in combination with the view of FIG. 7, one may observe a structure for second boom 88. Second boom 88 comprises a box beam 118 having a second fluid conduit 120 attached thereto. Operatively installed on second fluid conduit 120 are a plurality of second spray tips 122. A second eye 124 is mounted on the top of beam 118, and cable 113 is attached thereto and held under tension by rear biasing means 126. Also shown in the view of FIG. 8 is apron 90 and a rear portion 128 thereof which extends over the top of eye 124 and downwardly therefrom.

Mounted rearwardly of second fluid conduit 120 is rear curtain conduit 130, and a plurality of rear curtain spray tips 132 are operatively attached thereto.

As perhaps best seen the views of FIGS. 6 and 7, spray means 72 further comprises a pair of side curtain conduits 134 which also have a plurality of side curtain spray tips operatively attached thereto along their longitudinal dimensions. The side curtain conduits 134 and spray tips 136 are not visible in the view of FIG. 6 because a side portion 138 of apron 90 extends thereacross and downward toward supporting surface 68. Still with specific reference to the view of FIG. 7, it can be seen that a second cable 114 is provided on the outboard side of spray means 72, and its attachment is as previously described. The purpose of the two cables 114 is to provide support for the main horizontal segment of apron 90 so that it does not sag downwardly between first boom 86 and second boom 88.

Figure 10:
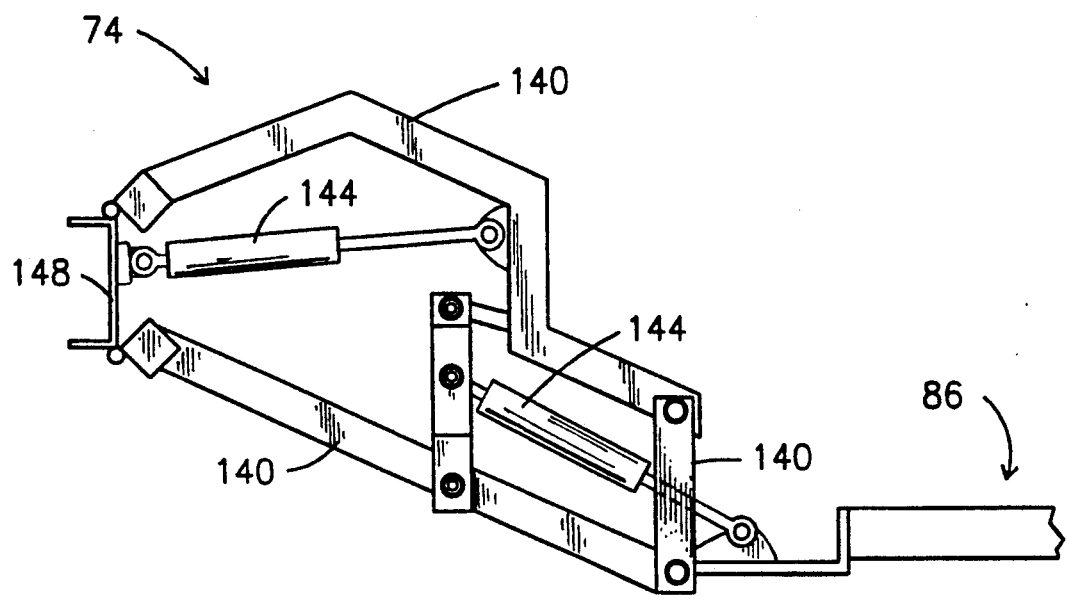
FIG. 10 is a side elevation of the front mounting means shown in plan in the view of FIG. 7.
Figure 11:
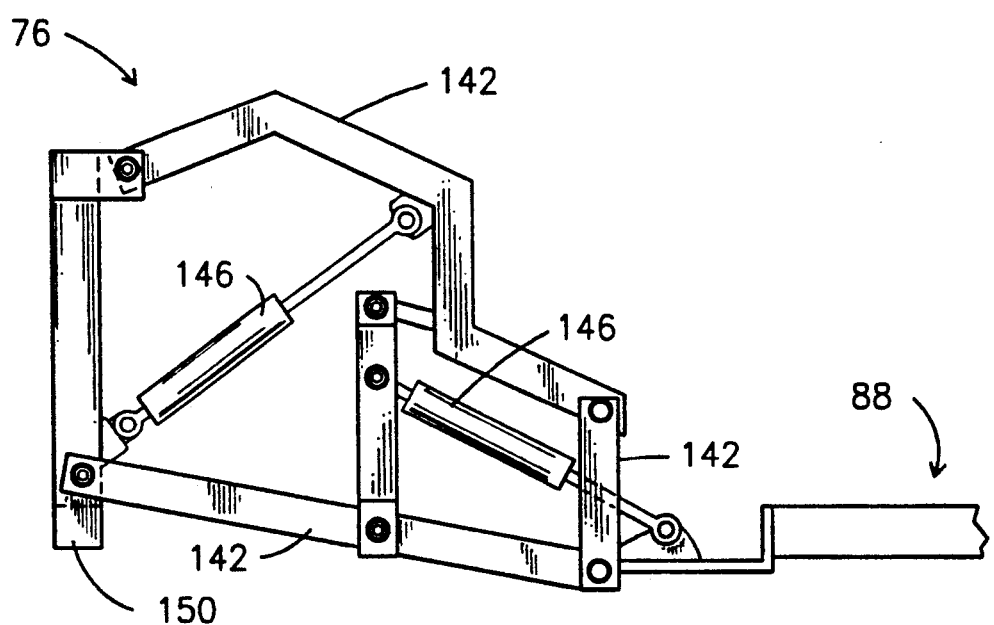
FIG. 11 is a side elevation of the rear mounting means shown in plan in the view of FIG. 7.

Referring to the views of FIGS. 10 and 11, it can be seen that forward mounting bracket 74 and rear mounting bracket 76 each comprise a series of pivoting links 140 and 142, respectively, and that each of the brackets 74 and 76 is moved by the action of respective hydraulic cylinders 144 and 146. Forward mounting bracket 74 is attached to the tractor 66 at tractor frame element 148, while rear mounting bracket 76 is attached to tractor 66 by shaft 150.

Though not shown in drawing FIGS. 6–11, it is to be understood that this preferred embodiment would also comprise control means substantially similar to control means 54 described above with regard to the previous embodiment. Having thus set forth a preferred construction for this embodiment, attention is now invited to a description of its use and the attendant unique method for controlling weeds and undergrowth as provided by the invention.

Utilization of this preferred embodiment is most especially characterized by the fact that it provides for quite effective control of weeds and undergrowth without the use of chemical agents. According to the preferred embodiment, the heated spray material is simply water which has been heated from a temperature of from about 100° F. to about 240° F. The heated water is sprayed from the plurality of first spray tips 100. Apron 90 preferably comprises an insulated material so that, as tractor 66 moves forwardly, the heated spray material is effectively insulated from ambient conditions and retained in close proximity with the weeds and/or undergrowth onto which it has been sprayed. Dependent upon the speed of travel of tractor 66, the heated spray is isolated from ambient conditions by apron 90 for as little as a few seconds to as long as a minute or more. Field testing of this embodiment has revealed that such use conditions are quite effective in controlling weeds, undergrowth and insects without the use of any chemical spray.

If desired, additional heated spray material may be deposited through auxiliary spray tips 104, thereby providing an even greater quantity and more complete coverage of heated water.

The second spray tips 122 that are provided on second boom 88 may be utilized for spraying heated water, but are primarily intended for use by spraying minor amounts of chemicals such as, for example, herbicides, insecticides or fertilizers, onto the area which has just been treated with the heated water spray. Field testing has indicated that such spraying of the previously-treated area with the desired chemicals not only seems to increase the efficacy of those chemicals, but also permits the use of much smaller than normal quantities of chemical. Of course, because all of the spray tips are enclosed by apron 90, there is virtually no problem of drift or accidental spraying of chemicals into an open environment.

The forward, rear, and side curtain spray tips, 110, 132 and 136, respectively, are primarily intended for use by providing a fine spray or mist of unheated water for the further purpose of isolating the treatment area beneath apron 90 from the environment. The control means of this embodiment is such that any one, or any combination, of the curtain spray tips may be utilized. Of course, this device could also be used to dispense a heated spray liquid including not simply water, but also aqueous mixtures of agricultural chemicals. The scope of this invention is certainly intended to include such uses, even though the preferred use of this embodiment is to control weeds, undergrowth and insects with a heated water spray. It is also to be understood that return lines and return tanks, such as those described with regard to the earlier embodiment, might also be incorporated into this preferred embodiment, and that return tanks would be incorporated on trailer 70. Finally, it is to be understood that the temperature of the spray material, the composition of the spray material, the speed of travel of tractor 66, and characteristics of the undesirable weeds, undergrowth or insects all must be considered in establishing optimum operation conditions for a specific application. The control means of the apparatus is the means by which these variables are adjusted to obtain optimal results. It is also to be understood that non-reactive materials such as oils and surfactants might frequently be included within the primary hot water spray material.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. Apparats for controlling weeds and undergrowth by the application of a liquid spray, said apparatus comprising: a supply of liquid to be sprayed; a first boom comprising at least one first spray tip mounted thereon; means for delivering said liquid from said supply to said first spray tip such that a liquid spray is emitted from said first spray tip in a predetermined direction toward the weeds and undergrowth; a second boom disposed in spaced apart, substantially parallel relation to said first boom; an apron attached to said first and second booms and extending therebetween, said apron being above the direction of spray from said first spray tip; tension means interposed between said first and second booms and beneath said apron, at least portions of said apron resting on said tension means such that said apron does not sag below said first and second booms in the region therebetween; and means for heating said liquid intermediate said supply and said spray tip, whereby a heated liquid spray is provided beneath said apron.

2. Apparatus as in claim 1 wherein said liquid comprises water.

3. Apparatus as in claim 1 further comprising a plurality of said first spray tips.

4. Apparatus as in claim 1 further comprising control means operatively connected to said apparatus whereby an operator may regulate the flow rate of said liquid, the temperature to which said liquid is heated, and the passage of said heated liquid through said first spray tip.

5. Apparatus as in claim 4 wherein said supply comprises a water tank and a chemical tank, each of said tanks being in operative communication with said means for delivering and with said control means.

6. Apparatus as in claim 5 wherein said chemical tank contains a spray material selected from the group consisting of water, herbicides, oils, surfactants, insecticides, fertilizers, and mixtures thereof.

7. Apparatus as in claim 6 wherein said second boom comprises at least one second spray tip mounted thereon, said second spray tip being operatively connected to said supply and said control means, whereby an operator may regulate the flow rate of said liquid and said spray material, the temperature to which said liquid and said spray material are heated, and the passage of said heated liquid and said spray material through said first and second spray tips.

8. Apparatus as in claim 7 further comprising a plurality of said first and second spray tips, said second spray tips being mounted on said second boom such that the direction of spray therefrom is beneath said apron.

9. Apparatus as in claim 8 further comprising means for transporting said apparatus across a support surface.

10. Apparatus as in claim 9 wherein said means for transporting comprises a tractor.

11. Apparatus as in claim 11 wherein said first and second booms and said apron are movably attached to said tractor whereby said first and second booms and said apron may be moved from a first, operative position to a second, transport position.

12. Apparatus as in claim 1 wherein said apron comprises a flexible material.

13. Apparatus as in claim 12 wherein said flexible material comprises a fabric.

14. Apparatus as in claim 1 wherein said apron comprises a forward apron segment which extends downwardly from said first boom and a rearward apron segment which extends downwardly from said second boom.

15. Apparatus as in claim 1 further comprising a plurality of curtain spray tips operatively mounted on said first and second booms and extending therebetween, said curtain spray tips being in fluid communication with said supply whereby liquid may be sprayed from said curtain spray tips around the perimeter of an area defined by said first and second booms and said apron.

16. A method for controlling weeds and undergrowth, said method comprising the steps of:
 a. preparing a liquid spray material;
 b. heating said spray material to a temperature of about 100° F. to about 240° F.;
 c. spraying said heated liquid spray material onto the substance to be controlled; and
 d. covering said sprayed substance for a predetermined period of time before exposing said sprayed substance to ambient conditions.

* * * * *

UNITED STATES PATENT AND TRADEMARK OFFICE
CERTIFICATE OF CORRECTION

PATENT NO. : 5,297,730

DATED : March 29, 1994

INVENTOR(S) : James E. Thompson

It is certified that error appears in the above-identified patent and that said Letters Patent is hereby corrected as shown below:

Column 12, line 37, delete second occurrence of "11" and insert therefor --1--.

Signed and Sealed this

Twenty-second Day of August, 1995

Attest:

BRUCE LEHMAN

*Attesting Officer*  *Commissioner of Patents and Trademarks*